(12) United States Patent
Joch et al.

(10) Patent No.: US 9,042,449 B2
(45) Date of Patent: May 26, 2015

(54) SYSTEMS AND METHODS FOR DYNAMIC TRANSCODING OF INDEXED MEDIA FILE FORMATS

(71) Applicant: Avvasi Inc., Waterloo (CA)

(72) Inventors: Anthony Joch, Waterloo (CA); Michael Gallant, Kitchener (CA); Roman Czeslaw Kordasiewicz, Elmira (CA); Mark Korhonen, Kitchener (CA)

(73) Assignee: Avvasi Inc., Waterloo, CA (US)

( * ) Notice: Subject to any disclaimer, the term of this patent is extended or adjusted under 35 U.S.C. 154(b) by 317 days.

(21) Appl. No.: 13/628,591

(22) Filed: Sep. 27, 2012

(65) Prior Publication Data

US 2013/0083848 A1    Apr. 4, 2013

Related U.S. Application Data

(60) Provisional application No. 61/541,053, filed on Sep. 29, 2011.

(51) Int. Cl.
| | |
|---|---|
| *H04N 7/12* | (2006.01) |
| *H04N 11/02* | (2006.01) |
| *H04N 11/04* | (2006.01) |
| *H04N 19/40* | (2014.01) |

(52) U.S. Cl.
CPC ..................... *H04N 19/40* (2014.11)

(58) Field of Classification Search
None
See application file for complete search history.

(56) References Cited

U.S. PATENT DOCUMENTS

| | | |
|---|---|---|
| 8,290,038 B1 | 10/2012 | Wang et al. |
| 2001/0009548 A1 | 7/2001 | Morris |
| 2005/0157660 A1 | 7/2005 | Mandato et al. |
| 2008/0195761 A1 | 8/2008 | Jabri et al. |
| 2008/0205389 A1 | 8/2008 | Fang et al. |
| 2011/0090953 A1* | 4/2011 | Melnyk et al. ........... 375/240.03 |
| 2011/0228859 A1 | 9/2011 | Sugimoto et al. |
| 2012/0117225 A1 | 5/2012 | Kordasiewicz et al. |
| 2013/0304934 A1 | 11/2013 | Joch et al. |

FOREIGN PATENT DOCUMENTS

| | | |
|---|---|---|
| CA | 2632885 | 6/2007 |
| CA | 2737476 | 6/2010 |

OTHER PUBLICATIONS

Co-pending U.S. Appl. No. 13/852,796, "Methods and Systems for Controlling Quality of a Media Session", filed Mar. 28, 2013.

* cited by examiner

*Primary Examiner* — Dave Czekaj
*Assistant Examiner* — Nam Pham
(74) *Attorney, Agent, or Firm* — Bereskin & Parr LLP/S.E.N.C.R.L., s.r.l.

(57) ABSTRACT

Methods and systems for transcoding from an input media stream to an output media stream, wherein the input media stream and the output media stream are in an indexed file format. The methods and systems are capable of generating an efficiently coded media file where the movie box is generated and sent before transcoding is complete, while maintaining acceptable and consistent quality throughout and minimizing the total size of the file.

18 Claims, 5 Drawing Sheets

SYSTEMS AND METHODS FOR DYNAMIC TRANSCODING OF INDEXED MEDIA FILE FORMATS

CROSS-REFERENCE TO RELATED APPLICATIONS

This application claims the benefit of U.S. Provisional Patent Application No. 61/541,053, entitled "Efficient Dynamic Transcoding to MP4 and Related Formats", filed Sep. 29, 2011. The entire contents of U.S. Provisional Patent Application No. 61/541,053 are hereby incorporated by reference.

FIELD

The described embodiments relate generally to transcoding or encoding, and more particularly to transcoding or encoding compressed audio and/or video to a format having an index of all compressed audio and/or video samples, such as the MPEG-4 format.

BACKGROUND

Media content is generally provided within a file or stream that conforms to a media container specification. A media container generally comprises the raw media samples (compressed audio and/or video frame data), as well as information required for proper playback, such as frame playback timing information. Media container formats that are based on the ISO Base Media File Format (MPEG-4 Part 12), such as .mp4, .mov and .3gp, are currently some one of the most prevalent file formats used for media streaming.

These file formats are typically organized in an indexed fashion. This indexing (which uses metadata) allows decoding and seeking to individual media samples (audio and/or video frames) within the file. The indexing generally registers complete size and position information for every sample (audio and/or video frames) in all tracks for the entire clip. The index is generally a required element of the file, contained in a single file section, and stored at the start or at the end of the file, depending on the application. Authoring content in these indexed formats via encoding or transcoding requires a full enumeration of the size and location of every frame.

For streaming applications, the index generally is transmitted as a single syntax element and must be received by a client player (and therefore fully defined and authored on the server) before playback can begin. The compressed audio and video frame data may be generated separately, on-the-fly and delivered to the client as needed (in real-time), but it must conform to the size and location values already transmitted in the index. Therefore, the compressed size and location of every frame must either be known or determined before streaming can be begin, such that the index can be authored and transmitted. These values cannot be changed afterwards. Consequently, indexed formats are much better suited for storage and archival than for real-time streaming delivery, yet a significant amount of media content is streamed in these container formats, such as .mp4 video delivered via HTTP progressive download.

A "fragmented MPEG-4" variant exists, which may partially avoid the above constraints. However, this fragmented format is not widely supported by mobile devices, thus limiting its usefulness.

SUMMARY

In a broad aspect, there is provided a method of transcoding from an input media stream to an output media stream, wherein the input media stream and the output media stream are in an indexed file format, the method comprising: receiving the input media stream, wherein the input media stream comprises an input movie box and an input media data box; generating a plurality of predicted frame sizes based on the input media stream; generating an output movie box for the output media stream based on the plurality of predicted frame sizes; transcoding a plurality of input frames in the input media data box to generate a plurality of output frames in an output media data box wherein the plurality of output frames are sized based on the plurality of predicted frame sizes; transmitting the output media stream, wherein the output movie box precedes the output media data box.

The method may further comprise transcoding at least one selected segment of the input media stream prior to generating the plurality of predicted frame sizes; and determining a plurality of transcoded frame sizes for the at least one selected segment based on the transcoding; wherein the generating the plurality of predicted frame sizes is based at least on the plurality of transcoded frame sizes.

The method may further comprise generating one or more input statistics based on the plurality of transcoded frame sizes, wherein generating the plurality of predicted frame sizes is based on the one or more input statistics.

In some cases, the transcoding is carried out in parallel by a plurality of transcoding modules. In some cases, each of the plurality of transcoding modules carries out the transcoding beginning at a random access point in the input media stream. In some cases, a plurality of output random access points are generated at different positions in the output media stream relative to a plurality of input random access points in the input media stream.

The method may further comprise storing a subset of the output media stream.

The method may further comprise identifying whether one or more input statistics is stored in a memory, wherein if the one or more input statistics is stored in the memory, the generating the plurality of predicted frame sizes is based on the one or more input statistics.

The method may further comprise determining the at least one selected segment based on sizes of a plurality of frames of the input media stream. In some cases, the at least one selected segment comprises the input media stream in its entirety.

In some cases, the transcoding further comprises determining whether the plurality of output frames meet a size constraint and, if not, repeating the transcoding with a second plurality of parameters to decrease size of the plurality of output frames.

The method may further comprise generating a plurality of encoding parameters associated with the output media stream.

The method may further comprise identifying whether a plurality of encoding parameters associated with the output media stream is stored in a memory, wherein if the plurality of encoding parameters is stored in the memory, the generating the plurality of predicted frame sizes is based on the plurality of encoding parameters.

The method may further comprise determining a type of encoder used for generating the input media stream, and wherein generating the plurality of predicted frame sizes is based on the type of encoder. In some cases, the type of encoder is determined based on the input media stream. In some cases, the type of encoder is determined based on an originating media server, wherein the input media stream is received from the media server.

The method may further comprise determining a quality level for transcoding the input media stream to the output media stream, wherein the generating the plurality of predicted frame sizes is based on the quality level for transcoding.

In some cases, the transcoding of the plurality of input frames in the input media data box is repeated one or more times.

In some cases, the input movie box comprises metadata information selected from the group consisting of: a number of tracks in the input media stream, a type of track in the input media stream, a track coding information, a frame size for one or more frames in the input media stream, a byte offset for one or more frames in the input media stream and a play duration of one or more frames in the input media stream.

In some cases, the indexed file format is selected from the group consisting of MP4, MOV and 3GP formats.

In another broad aspect, there is provided an apparatus for transcoding from an input media stream to an output media stream, wherein the input media stream and the output media stream are in an indexed file format, the apparatus comprising: a memory; a network interface; and a processor communicatively coupled to the memory and the network interface, the processor configured to carry out a method as described herein.

In another broad aspect, there is provided a system for transcoding from an input media stream to an output media stream, wherein the input media stream and the output media stream are in an indexed file format, the system comprising: a receiver module configured to receive the input media stream, wherein the input media stream comprises an input movie box and an input media data box; a frame size predictor module configured to generate a plurality of predicted frame sizes based on the input media stream; a media data box generator module configured to generate an output movie box for the output media stream based on the plurality of predicted frame sizes; at least one transcoder module configured to transcode a plurality of input frames in the input media data box to generate a plurality of output frames in an output media data box wherein the plurality of output frames are sized based on the plurality of predicted frame sizes; a stream output module configured to transmit the output media stream, wherein the output movie box precedes the output media data box.

In some cases, the media processing module is configured to transcode at least one selected segment of the input media stream prior to generating the plurality of predicted frame sizes and the size generation module is configured to determine a plurality of transcoded frame sizes for the at least one selected segment and to generate the plurality of predicted frame sizes based at least on the plurality of transcoded frame sizes.

The system may further comprise a statistics generation module configured to generate an input statistics file based on the plurality of transcoded frame sizes, and wherein the size generating module is configured to generate the plurality of predicted frame sizes based on the input statistics file.

In some cases, the at least one transcoder comprises a plurality of transcoding modules. In some cases, each of the plurality of transcoding modules carries out the transcoding beginning at a random access point in the input media stream. In some cases, a plurality of output random access points are generated at different positions in the output media stream relative to a plurality of input random access points in the input media stream.

In some cases, the at least one transcoder is configured to store a subset of the output media stream.

In some cases, the size generating module is further configured to identify whether an input statistics is stored in a memory and if the input statistics file is stored in the memory, to generate the plurality of predicted frame sizes is based on the input statistics file.

In some cases, the at least one selected segment is determined based on sizes of the plurality of input frames. In some cases, the at least one selected segment comprises the input media stream in its entirety.

In some cases, the at least one transcoder is further configured to determining whether the plurality of output frames meet a size constraint and, if not, to repeat the transcoding with a second plurality of parameters to decrease size of the plurality of output frames.

The system may further comprise a stream parameter generation module configured to generate a stream parameter file associated with the output media stream, the stream parameter file comprising an indication of sizes of the plurality of output frames. In some cases, the stream parameter file comprises encoder settings and wherein the size generating module is configured to generate the plurality of predicted frame sizes based on the encoder settings.

In some cases, the size generating module is further configured to identify whether a stream parameter file associated with the output media stream previously exists, the stream parameter file comprising an indication of sizes of the plurality of output frames and if the stream parameter file previously exists, to generate the plurality of predicted frame sizes is based on the stream parameter file.

In some cases, the size generating module is configured to determine a type of encoder used for generating the input media stream and to generate the plurality of predicted frame sizes is based on the type of encoder. In some cases, the type of encoder is determined based on the input moov box. In some cases, the type of encoder is determined based on a media location, wherein the input media stream is received from the media location.

In some cases, the size generating module is further configured to determine a quality level for transcoding the input media stream to the output media stream and to generate the plurality of predicted frame sizes based on the quality level for transcoding.

In some case, the media processing module is configured to transcode the plurality of input frames in the input media data box one or more times.

In some cases, the input movie box comprises metadata information selected from the group consisting of number of tracks in the input media stream, types of tracks in the input media stream, track coding information, frame sizes for frames in the input media stream, byte offset for frames in the input media stream and play duration of frames in the input media stream.

In some cases, the indexed file format is selected from the group consisting of MP4, MOV and 3GP formats.

BRIEF DESCRIPTION OF THE DRAWINGS

Preferred embodiments of the present invention will now be described in detail with reference to the drawings, in which.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g. ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. The computer usable instructions may also be in various forms, including compiled and non-compiled code.

The need for a completed index in indexed file formats imposes significant practical limitations on implementations. For example, for live events, the size and location of every frame may not be knowable until the final sample is encoded. Without a finalized index, the encoding is incomplete. As such, the content may be unavailable for consumption until the indexing is finalized, which would only occur at the end of the event. This represents an unacceptable delay for most live event situations, because most viewers expect to be able to view the event as it is ongoing.

As another example, in a conventional real-time transcoding system, the system will typically download and re-encode input files roughly in real-time, or slightly faster (i.e., the media is re-encoded as fast as it is played back). However, if it was necessary to encode all output frames (so that their exact sizes are known) prior to sending the index, the delay before beginning playback would be approximately equal to the playback duration of the media file. This represents an unacceptable delay for many media streaming applications, because a viewer of the media content may expect playback to begin within a few seconds of the initial request for the content.

Accordingly, for streaming of live events and dynamic transcoding of streaming media, the index (e.g., comprising the size and location of each frame) must be generated and sent before all of the samples can be encoded. Once the index is transmitted, the sizes and location of each compressed media sample are constrained (e.g., by the size and position information sent to the client in the index).

In some applications, a specific byte range of the video file can be requested, further complicating the process of dynamic transcoding of indexed file formats. This can occur if a user seeks to a specific location in the file or due to the protocol used by the client requesting the file. In some of these cases, the requested byte ranges may even overlap. To service a request for a specific byte range while streaming the file, the transcoding system must have determined the full index and all samples before and within the byte range. The transcoding system must also ensure that it always produces the same output for samples which are common to overlapping byte range requests.

The described embodiments overcome some disadvantages of the indexed file format by estimating the compressed sample sizes a priori and generating the index based on those estimates. In some cases, additional margin may be added to ensure the compressed samples will fit within the allocated size. A smaller encoded sample size can be accommodated by filling with "padding" bytes that occupy space unused by encoded data. In some cases, it may be possible to improve the compression efficiency of video files that use padding bytes by using gzip or other suitable lossless compression algorithms when transmitting the compressed files. For example, HTTP supports gzipped content-encoding and gzipped transfer-encoding (as well as other types of encoding) on many types of files including video files. However, not all clients will support gzip or other lossless compression algorithms for file transfer, thus limiting its usefulness.

However, padding bytes typically contain no useful information and may be essentially wasted data on the network. This can impose costly inefficiency, since the typical goal for systems that perform live encoding or dynamic transcoding is to reduce bandwidth while maintaining the best possible quality.

In order to provide a quality viewing experience with lossy media compression, it is important to maintain consistent quality in the generation of the output media stream. With lossy media codecs, quality is a factor of the complexity of the content, the encoder's ability to efficiently represent that complexity, and the bit rate allocated to encoding the content. Content that is more complex for the encoder to represent requires more bits to maintain a high level of quality than content that is easy to represent.

However, generating and sending the index constrains the maximum size of each frame, regardless of the complexity of the content and the encoder's ability to represent it efficiently. Thus, if some selected segment of the input content is very complex for the re-encoder, ideally more bits will be allocated to this selected segment in order to maintain the quality. For less complex content, fewer bits should be allocated, as allocating too many bits would be wasteful.

In a transcoding system, a basic approach to predicting output frame sizes involves scaling the input frame sizes (which may be obtained from the index of the input file) based on the ratio of input bitrate to desired output bitrate. However, due to the complex nature of video content and video compression techniques, such an approach is generally sub-optimal and may lead to excessive amounts of padding data in the output bitstream, or poor visual quality due to more aggressive compression to fit the allocation, or both.

The improved approach described herein is capable of generating an efficiently coded media file where the index is generated and sent before encoding or transcoding is complete, while maintaining acceptable and consistent quality throughout and minimizing the total size of the file (e.g., using minimal padding).

Although the exemplary embodiments are shown primarily in the context of mobile data networks, it will be appreciated that the described systems and methods are also applicable to other network configurations. For example, the described systems and methods could be applied to data networks using satellite, digital subscriber line (DSL) or data over cable service interface specification (DOCSIS) technology in lieu of, or in addition to a mobile data network.

The described embodiments may generally provide systems and methods to control access to a multimedia stream in a streaming session to manage multimedia traffic in wired and wireless communication networks.

Figure 1:
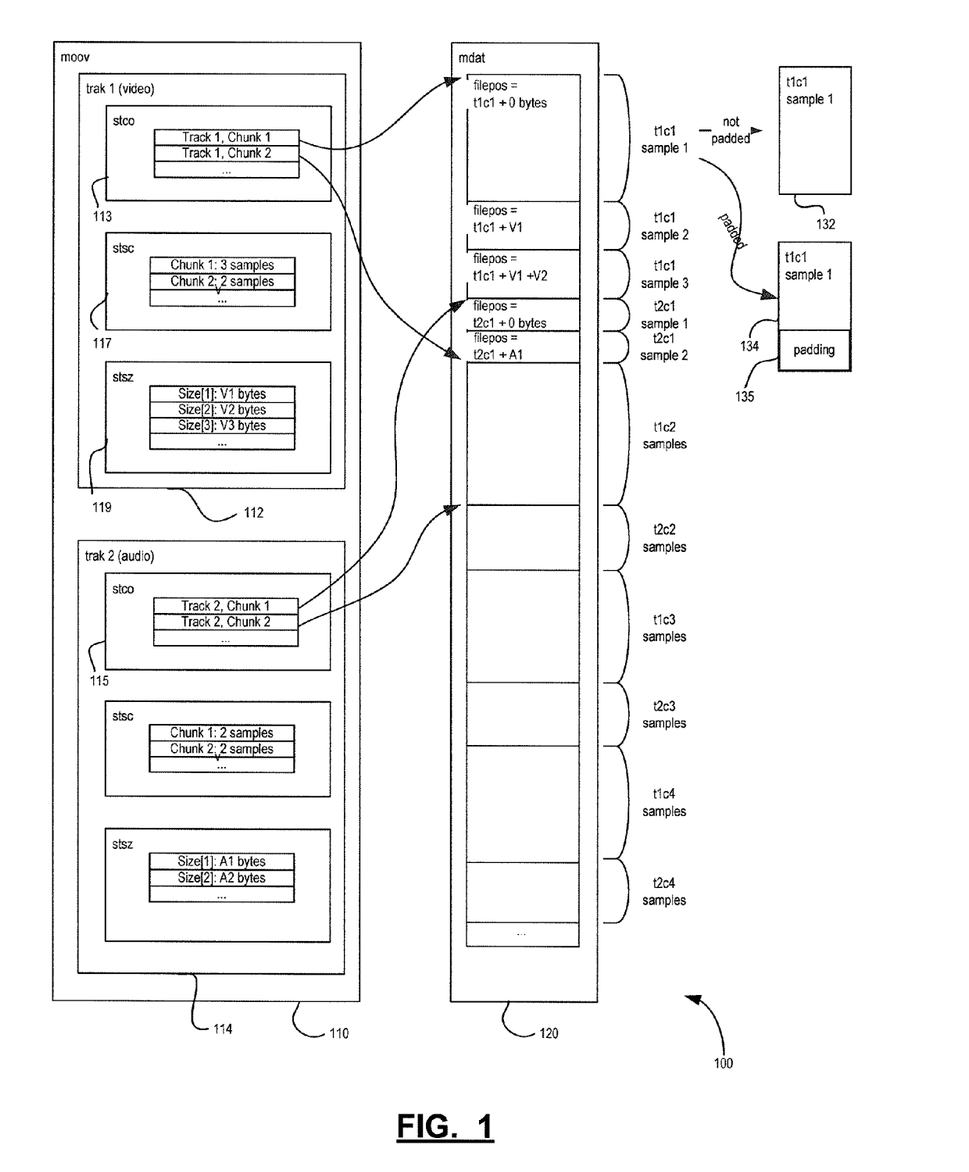
FIG. 1 is a simplified block diagram illustrating the structure of an MPEG-4 container file.

Reference is first made to FIG. 1, illustrating an example data structure of an MPEG-4 container file. An MPEG-4 file 100 is composed of a number of discrete units called atoms or boxes, arranged in a tree-like hierarchy. Note that for simplicity, many boxes and box types, including some encapsulation layers of the hierarchy are omitted from this example. A unique tag and a length identify each box. The main 'parent' boxes of the file are the file type 'ftyp' (not shown), media data 'mdat', and movie 'moov' boxes.

An ftyp box appears first, and denotes the MPEG-4 file type and basic versioning of the box structures.

A mdat box 120 comprises the actual compressed audio and video frame data, and generally takes up the bulk of an MPEG-4 file.

A moov box 110 contains the most additional boxes generally defining metadata, such as the timescale, duration, display characteristics of the clip, as well as containing sub-boxes defining information for each sample in each track (audio and video) in the clip. Generally, the moov box 110 must be received by the client player (and therefore fully defined and authored on the server) before playback begins.

Within the mdat box 120, the compressed audio and video frame data is defined according to tracks. Note that compressed audio and video data can be in various formats, such as AAC audio and H.264 video. Each track can have multiple chunks and each chunk can have multiple samples. Typically, a sample corresponds to a single audio or video frame. Each chunk includes temporally continuous sample data. The size of the chunks and the number of included samples are not limited, and individual chunks can have arbitrary sizes and numbers of samples. In the example of FIG. 1, one audio frame chunk is inserted after every video frame chunk (e.g., interleaved).

The moov box 110 contains metadata. It contains a movie header box mvhd (not shown) that defines the timescale and duration information for the entire movie, as well as its display characteristics. It also contains one track box trak for each track in the movie, such as track box 112 and 114. Each track box contains one or more media boxes mdia (not shown) which may contain one or more sample table boxes stbl (not shown) that describe the metadata information for all the chunks and samples for the corresponding data track. In the example of FIG. 1, there is one video trak box 112 and one audio trak box 114, and the chunk and sample metadata information for each is stored within corresponding stbl boxes (not explicitly shown).

The stbl box contains several boxes: the sample description box stsd (not shown), sample size box stsz or stz2, sample-to-chunk box stsc, and chunk offset box stco or co64. Information for reproducing the track data is stored in the stsd box. For example, codec type, high-level encoding information, color information, etc., are stored for the video track, and encoding information, sample rate, etc., are stored for the audio track.

The offset from the start of the file to the location of each chuck is recorded in the stco or co64 box. These offsets are stored as arrays in the audio and video data tracks. The example in FIG. 1, shows an stco box 113 within the video trak box 112 as well as the location for the first two chunks of the video track. These values are byte offsets from the start of the file and point into the location of the corresponding chunks within mdat box 120. FIG. 1, also shows a corresponding stco box 115 within the audio trak box 114 as well as the location for the first two chunks of the audio track within mdat box 120.

Since chunks can contain a variable size of samples, the stsc box indicates the number of samples in each chunk. These offsets are stored as arrays in the audio and video data tracks. The example in FIG. 1, shows an stsc box 117 within the video trak box 112 as well as the number of samples in each of the first two chunks of the video track. FIG. 1, also shows a similar stsc box within the audio trak box 114 as well as the number of samples in each of the first two chunks of the audio track.

The size of each sample in a given track is stored in the stsz or stz2 box. For compressed audio and video, the size of each sample may be variable, and these sizes, for all samples, are stored as an array for the tracks. The example in FIG. 1 shows the beginning of stsz box 119 for the video trak box 112. The sizes of the first three video samples are V1, V2, and V3 bytes respectively. Similarly, the beginning of the stsz box for the audio trak box 114 is shown. The sizes of the first two aduion samples are A1 and A2 bytes respectively.

In this tree-like hierarchy, the moov box 110 acts like an index to every sample of the compressed audio and video data. Chunks and samples are referenced through the moov box 110 to enable basic decoding/playback as well as seeking within the file.

The relative order of the moov and mdat boxes is, in general, flexible. As mentioned, for streaming applications, the moov box 110 is typically sent in its entirety at the beginning of the file, followed by the mdat box 120. Fragmenting of the moov box 110 throughout the file is typically not supported. Accordingly, media players receive the entire moov box 110, containing all of the metadata, and then start to receive the actual frame data in the mdat box 120. Once sufficient frame data is received, playback can begin.

The primary difficulty encountered when dynamically transcoding and streaming such a format is that the exact size of all of the media frames cannot, in general, be known until all of the frames have been re-encoded. It is not unusual for every value in the stsz (or stsz2) and stco (or co64) boxes to be changed during re-encoding. Without knowledge of the exact size of all the media frames, the moov box 110 cannot be generated and transmitted to the playback device. Conversely, on the playback device, playback cannot begin until the moov box 110 is received.

Shown in FIG. 1. is a first video sample 132 (e.g., a video frame) from track 1 (e.g., track 1, chunk 1, sample 1). In a conventional case, the entire sample 132 contains useful compressed video information. Also shown is a second video sample 134 containing useful compressed video information corresponding to track 1, chunk 1 and sample 1, but further comprising padding data 135.

For the transcoded sample 134, the new sample size may be coarsely predicted as requiring V1 bytes. In attempting to fit within and not exceed the V1 bytes, the encoder may only produce VI bytes. The remaining V1-V1' bytes are filled with padding bytes to produce padding data 135. Excessive amounts of padding may result in the need to transmit unnecessary data (padding) and degraded visual quality due to aggressive compression to fit the V1 allocation.

Figure 2:
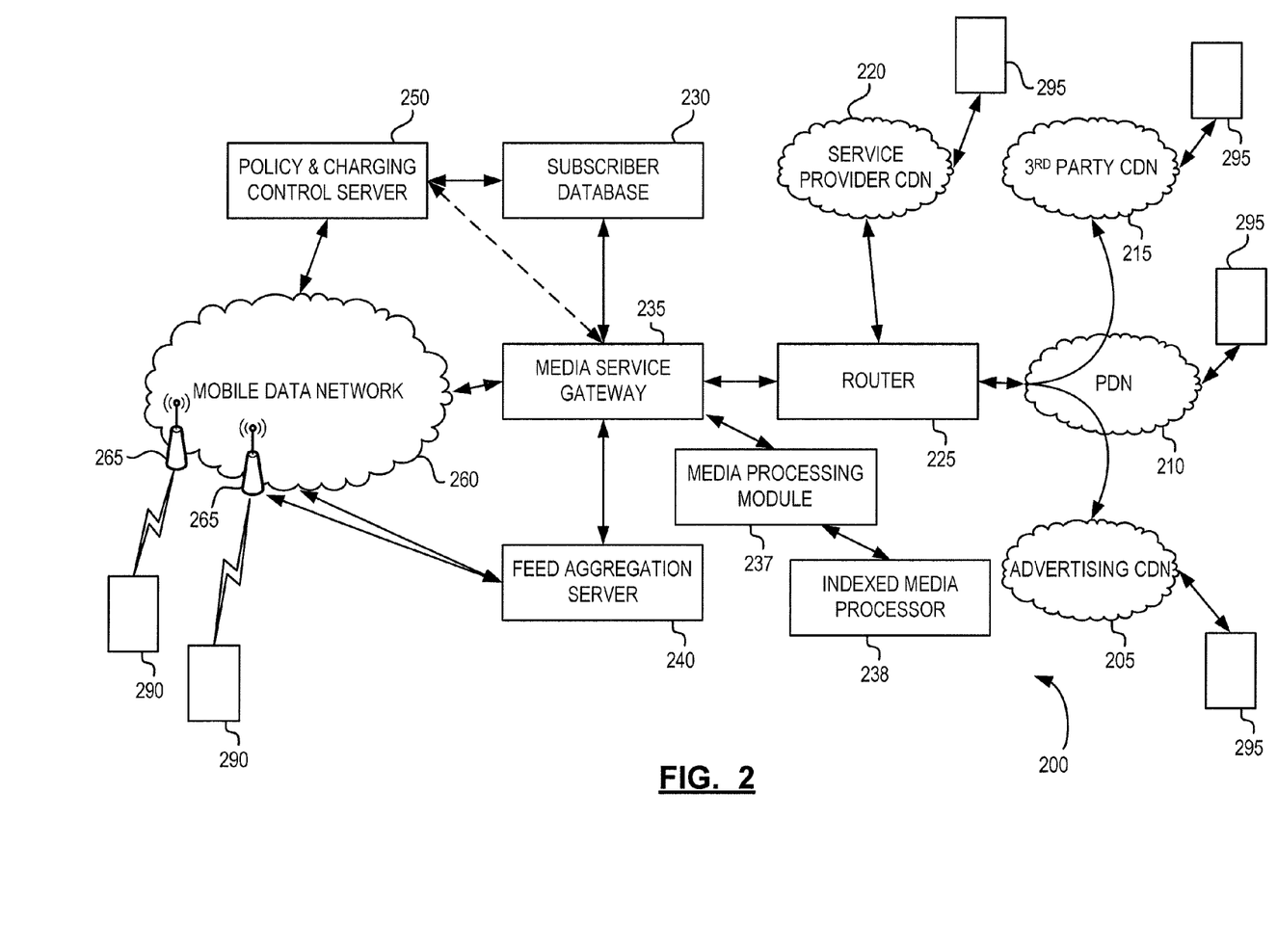
FIG. 2 is a simplified block diagram of a media service delivery system in accordance with an example embodiment.

Reference is now made to FIG. 2, illustrating a block diagram of a media service delivery system 200 in accordance with an example embodiment. System 200 generally comprises a media service gateway 235 that interfaces between one or more delivery networks and a mobile data network 260.

Advertising content delivery network (CDN) 205, primary delivery network 210, third party CDN 215, service provider CDN 220, and mobile data network 260 may comprise data networks capable of carrying data, such as the Internet, public switched telephone network (PSTN), or any other suitable local area network (LAN) or wide area network (WAN). In particular, mobile data network may comprise a Universal Mobile Telecommunications System (UMTS), 3GPP Long-Term Evolution Advanced (LTE Advanced) system, Worldwide Interoperability for Microwave Access (WiMAX) system, other 3G and 4G networks, and their equivalent and successor standards.

Mobile data network 260 may comprise a plurality of base transceiver stations 265, which are operable to communicate with individual client devices 290.

Networks 205, 210, 215 and 220 may comprise content delivery networks. In some embodiments, one or more of networks 205, 210, 215 and 220 may be merged or incorporated into one another as part of a single network.

In general, a content delivery network comprises a plurality of nodes. Each node may have redundant cached copies of content that is to be delivered upon request. The content may be initially retrieved from a media server 295 and subsequently cached at each node according to a caching or retention policy.

CDN nodes may be deployed in multiple geographic locations and connected via one or more data links (e.g., backbones). Each of the nodes may cooperate with each other to satisfy requests for content by clients while optimizing delivery. Typically, this cooperation and delivery process is transparent to clients.

In a CDN, client requests for content may be algorithmically directed to nodes that are optimal in some way. For example, a node that is geographically closest to a client may be selected to deliver content. Other examples of optimization include choosing nodes that are the fewest number of network hops away from the client, or which have the highest current availability.

One or more client devices 290 may request media content from media servers 195. In the illustrated embodiments, client devices 290 may be any computing device, comprising a processor and memory, and capable of communication via a mobile data network. For example, client devices 290 may be a personal or portable computer, mobile device, personal digital assistant, smart phone, electronic reading device, and portable electronic devices or a combination of these. The client device 290 is generally operable to send or transmit requests for media content.

In various embodiments, the client device 290 includes a requesting client which may be a computing application, application plug-in, a widget, media player or other mobile device application residing or rendered on the device 290 in order to send or transmit one or more requests.

Media server 295 may comprise one or more servers equipped with a processor and memory storing, for example, a database or file system. Media server 295 may be any server that can provide access to multimedia content, such as video and audio content in a streaming session by, for example, storing the multimedia content. The content may comprise a wide variety of user-generated content, including movies, movie clips, TV shows, TV clips, music videos, video blogging and short original videos etc. Examples of media server 295 may include websites such as YouTube™ and Netflix™, etc. Media server 295 may also store a plurality of versions of the same multimedia content, such as, for example, different formats or resolutions of the same multimedia content. For example, a media server may store the same movie clip in two or more video resolutions, such as 480p, 720p, 1080i or 1080p. Likewise, the media server may store the same movie clip in two or more video codecs, such as Google VP8 or Moving Picture Experts Group MPEG-4 Advanced Video Coding (MPEG-4 AVC).

Generally, a media server 295 is operable to commence a media streaming session in response to a request for multimedia content from a client device 290, as described further herein. The request may traverse mobile data network 260 and be relayed to media service gateway 235. Media service gateway 235 may deny the request, modify it, or transmit it further to the respective media server 295 via a router 225, which connects to a suitable network for delivering the request. In some embodiments, router 225 may be incorporated into media service gateway 235, or into one or more of networks 205, 210, 215 or 220.

Media service gateway 235 may be a server system equipped with a processor and memory storing, for example, a database or file system. Although only one media service gateway 235 is shown for clarity, there may be multiple media service gateways 235 distributed over a wide geographic area and connected via, for example, a data network such as service provider CDN 220. Media service gateway 235 may further comprise a network interface for connecting to the data networks comprising system 200. In some embodiments, media service gateway 235 may be incorporated into a hardware router 225, as a software module, for example.

Media service gateway 235 may comprise or be coupled to a media processing module 237, which can be a software application executed by a processor of the media service gateway 235 or a hardware processor coupled to the media service gateway 235 (or, in some cases, both). Media processing module 237 may be configured to perform inline, real-time transcoding of selected media sessions. Media processing module 237 may also be configured for an off-line, batch conversion workflow mode. Such an offline mode can be used to generate additional operating points (e.g., bitrates and resolutions) for a particular media content item as resources become available. This can be desirable where a particular media content item is frequently delivered in a variety of network conditions.

Media processing module 237 may perform format conversion, resolution conversion, frame-rate conversion, and bit-rate conversion for a wide range of container formats and codecs in or near real-time and, in particular, for indexed file formats. Conversion may involve receiving an input media file or stream, parsing and/or decoding the container layer and constituent audio and video bit-streams, predicting frame sizes and refining predictions for the output media file or stream, through pre-encoding and statistical analysis, and generating the output indexed media file or stream using these predicted (and refined) frame sizes. In some cases, media processing module 237 can perform conversion on-the-fly.

Figure 3A:
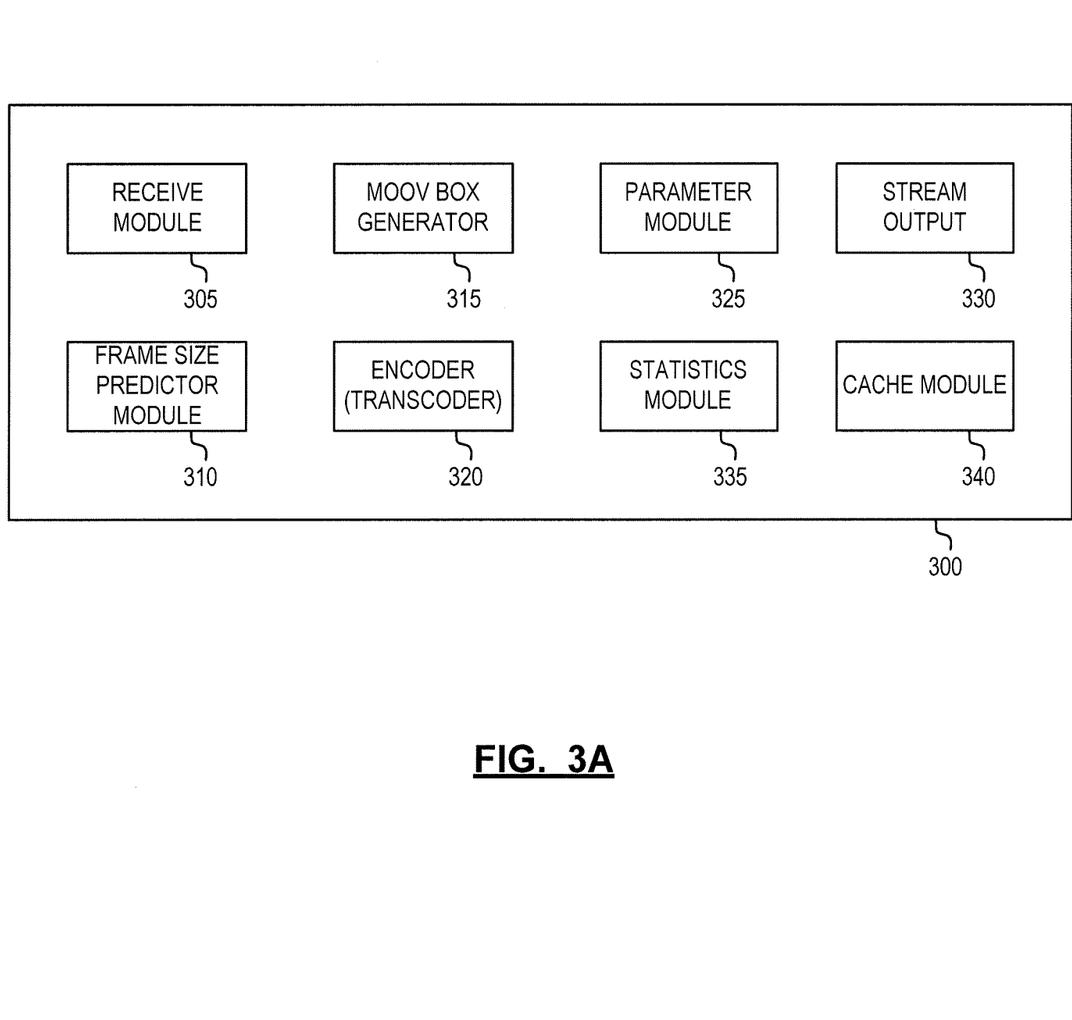
FIG. 3A is a simplified block diagram of an exemplary media processor, such as the media processing module of FIG. 2.

Media processing module 237 may comprise or be coupled to an indexed media processor 238 which is capable of dynamically transcoding (e.g., decoding and re-encoding) media data from a source format into an indexed format, such as the MPEG-4 File Format (MPEG-4 part 14) or other indexed formats. In some cases, the source format may also be an indexed format. Referring now to FIG. 3A, there is illustrated a simplified block diagram of an example indexed media processor 300, such as indexed media processor 238 of FIG. 2. In general, indexed media processor 300 attempts to provide efficient dynamic transcoding of media content by predicting the output media frame sizes prior to final re-encoding. In some cases, prediction may be based on a trial encoding run or on encoding parameters generated during previous transcoding of the same input media.

Indexed media processor 300 generally comprises a receive module 305, a frame size prediction module 310, a moov box generator module 315, an encoder (transcoder) module 320, a parameter module 325, a stream output module 330, a statistics module 335, and a cache module 340.

Receive module 305 generally may receive media content and data used to transcode the media content, such as statistical data, encoding parameters and subscriber or carrier policies. Receive module 305 may also parse media content to identify media frames and metadata.

In particular, receive module 305 may receive media container files or streams (e.g., in an MPEG-4 container). The media stream will typically begin with a moov box, followed by an mdat box.

Receive module 305 may parse the moov box to determine, for example, the number of tracks and their type, coding information about each track (e.g., codec used, video resolution, audio sampling rate, etc.), sizes of media frames and byte offsets within the stream, and the playback durations of media frames.

Receive module 305 may parse the mdat box to retrieve the media frame data used by encoder module 320.

Receive module 305 may also receive encoding parameters generated during previous transcoding of the same input media stream (or container files), which may contain indications of the encoder settings used to produce the previous transcoded media stream.

Receive module 305 may also receive statistics data regarding the coding complexity of the media content, which may also have been gathered during previous transcoding sessions for the same input media stream or container files.

Frame size predictor module 310 may be used to predict frame sizes for output media data prior to re-encoding by encoder module 320. Predictions may be based on data received by receive module 305, including stream parameters and statistics data from previous transcoding, if available. If data from a previous transcoding pass is not available, frame size predictor module 310 may compute complexity data based on characteristics e.g., relative sample sizes and encoding parameters, from the input media stream (either per-frame or aggregate) to predict estimated frame sizes.

The predicted frame sizes may begin with a maximum size estimate and be further refined. The predictions may be based on frame sizes in the original media stream or file (e.g., determined from a moov box or similar structure). Predictions may also be refined by pre-encoding selected segments of the media content to determine the actual frame sizes for the selected segment. The actual frame sizes can then be used to inform further predictions. The segments selected for pre-encoding may be chosen based on data available in the moov box and provided to encoder 320. In some cases, the selected segment may be an initial portion of the media content, where the length of the initial portion is determined according to the length of content that can be encoded by encoder module 320 in a predetermined time interval or latency window (e.g., the time before a moov box is to be transferred to a client device). In general, the more content that can be transcoded before sending the moov box, the more accurate the remaining predicted frame sizes can be. In general, representative segments of the input media to pre-encode may be determined based on the sizes of the input frames, as determined from the input moov box, as well as other parameters that may be parsed from the picture or slice headers of the bitstream. A representative segment may be a segment exhibiting complexity which is typical of the majority of the input media stream. For example, parsing may detect where features such as weighted prediction or large numbers of reference frames are used in the original encoding, which can be indication of complexity.

In some cases, such parsing may be used to detect several different sections of average, difficult, or easy content complexity.

In some cases, it may be possible to transcode the entire media stream within the acceptable latency window, for example, by downloading the media stream in parallel and employing parallel processing to transcode the entire media stream using a sufficient amount of processing hardware resources.

Predicted frame sizes may also be based on knowledge of the particular encoder that was used to generate the input stream or file, and the parameters used, e.g., based on the media server that is serving the file, auxiliary information in the moov box or in the compressed bit stream (e.g. H.264 Supplementary Enhancement Information (SEI) messages), and the like. The knowledge of the source encoder may be collected from previous transcoding session that had the same source encoder.

Frame sizes may also be predicted based on knowledge of the typical or average resulting frame size and quality level when transcoding from a known input configuration (e.g., input codec, resolution, frame rate) to a known output configuration (e.g., output codec, resolution, frame rate).

Moov box generator module 315 can be used to generate an appropriate moov box for an output media stream, based in part on the predicted frame sizes provided by frame size predictor 310. The moov box generator module should also generate and maintain a mapping between the output moov box and the input moov box, e.g. to permit modification of random access points while supporting byte range requests.

Random access points generally provide a means for seeking to specific locations within media files. A random access point can be defined as a point in the media stream that does not require data from a preceding frame to facilitate further decoding. That is, all pictures needed for display after this point will have no decoding dependency on any data preceding this point, and they are also present in the decoding sequence after this point. For the MPEG-4 file format, each track (e.g. audio and video) may contain random access points. For H.264 video, random access points generally correspond to Instantaneous Decoder Refresh (IDR) frames. A random access point is also called an entry-point. It may be desirable for the transcoding system to be able to change the random access point locations to improve compression efficiency, e.g. reducing the frequency of random access points, selecting content-specific random access points, reducing the frame rate in the output media stream, changing the GOP structure in the output media stream, etc.

When a specific byte range in the output file is requested (e.g. due to the behavior of the protocol used to transfer the media file, or a seek initiated by the user, etc.), the indexed media processor should determine which output samples are to be provided and which video frames should be encoded to generate these output samples. This set of frames may be a superset of the requested output samples because the encoded frames in the output samples may depend on previously encoded frames. Subsequently, the indexed media processor should determine which video frames are to be decoded to be able to encode the required video frames; this may be a superset of the output frames when the group-of-pictures (GOP) structure or random access points change. If the indexed media processor has not yet received the bytes necessary to decode the pictures, it may request those bytes via receive module 305.

Encoder (transcoder) module 320 performs encoding, re-encoding and/or transcoding of media content based on appropriate parameters. Accordingly, encoder module 320 may generate a moov box and continue transcoding remaining frames in a media stream.

Generally, encoder module 320 attempts to encode each media segment and frame to fit within the respective predicted frame size. If a predicted frame size is exceeded, encoder module 320 may attempt to re-encode the frame one or more times with varying parameters to meet the frame size constraint while maintaining optimal quality. As described herein, if a re-encoded frame is smaller than the predicted frame size, padding bytes may be inserted to match the predicted frame size.

As frames are encoded or re-encoded, the transcoder may use knowledge gained from the encoding of previous frames to produce frames that are closer in size to the predicted frame size, thereby minimizing padding and optimizing quality, given the predicted frame sizes that have already been determined.

In some cases, it may be desirable to employ parallel processing to transcode portions of (or the entire) media stream using a sufficient amount of processing hardware resources to reduce latency and improve frame size prediction, e.g., for pre-transcoding content before it is requested by the client, to better support byte range requests, etc. To efficiently utilize transcoding resources, transcoders may be configured to generate video starting from non-overlapping sections, where a section is defined as a collection of sequential pictures which starts at a random access point and ends one picture before another random access point. When a client requests a portion of a file that has not yet been generated, indexed media processor may allocate a transcoding resource to begin transcoding the containing section(s). A single media session may be permitted to use multiple transcoding resources which may be allocated sections in priority order based on expected request and/or viewing time of a given section. Stream output module 330 may generate an output media stream based on the mdat box data and movie data from moov box generator module 315 and encoder module 320, respectively. In some cases, stream output module 330 may generate MPEG-4 container files with transcoded media.

Parameter module 325 may generate index files that describe the frame sizes in the transcoded output (e.g., the data in the output moov box) and encoder settings used to generate the output media stream.

Statistics module 335 may generate statistical data used to summarize the coding complexity of the content, which may be gathered during the transcoding process.

Cache module 340 can be used to store all or portions of the output media stream as well as statistics data from previous transcoding. Caching can replace the need to generate the same data multiple times, in the case of common samples between overlapping byte range requests. Caching also helps support parallel transcoding, as portions of the output file that have not yet been requested or transmitted can be generated and stored. Caching can reduce the latency to service new byte-range requests, in the case where the range of interest has already been generated and is cached. Caching is also beneficial for multiple clients requesting the same content, as they can all be serviced by the portions of the generated file instead of transcoding them again. If a transcoder serving another client needs a portion of the file that has already been generated, or is in the process of being generated, then it can simply provide the cached output instead of regenerating it again.

When a transcoder needs a portion of the file that has not yet been generated, it can start transcoding the section between random access points. With this approach, servicing a single request may involve gathering data from multiple instances of transcoders as well as cached output. In cases where it is not possible to cache the entire output file (e.g., an extremely large file), the required sections may be transcoded again.

Conventional transcoders do not take into account accurate characteristics of the input bitstream (e.g., encoding complexity) and the resulting size vs. quality tradeoffs when transcoding, which can be gathered from encoding some or all of the bitstream prior to generating the moov box (either immediately, or based on cached statistics from a previous transcoding of the same content). This limitation can result in excessive padding being used, which is wasted data that must be sent on the network, or poor visual quality, or both. The present invention significantly improves upon these disadvantages.

Figure 3B:
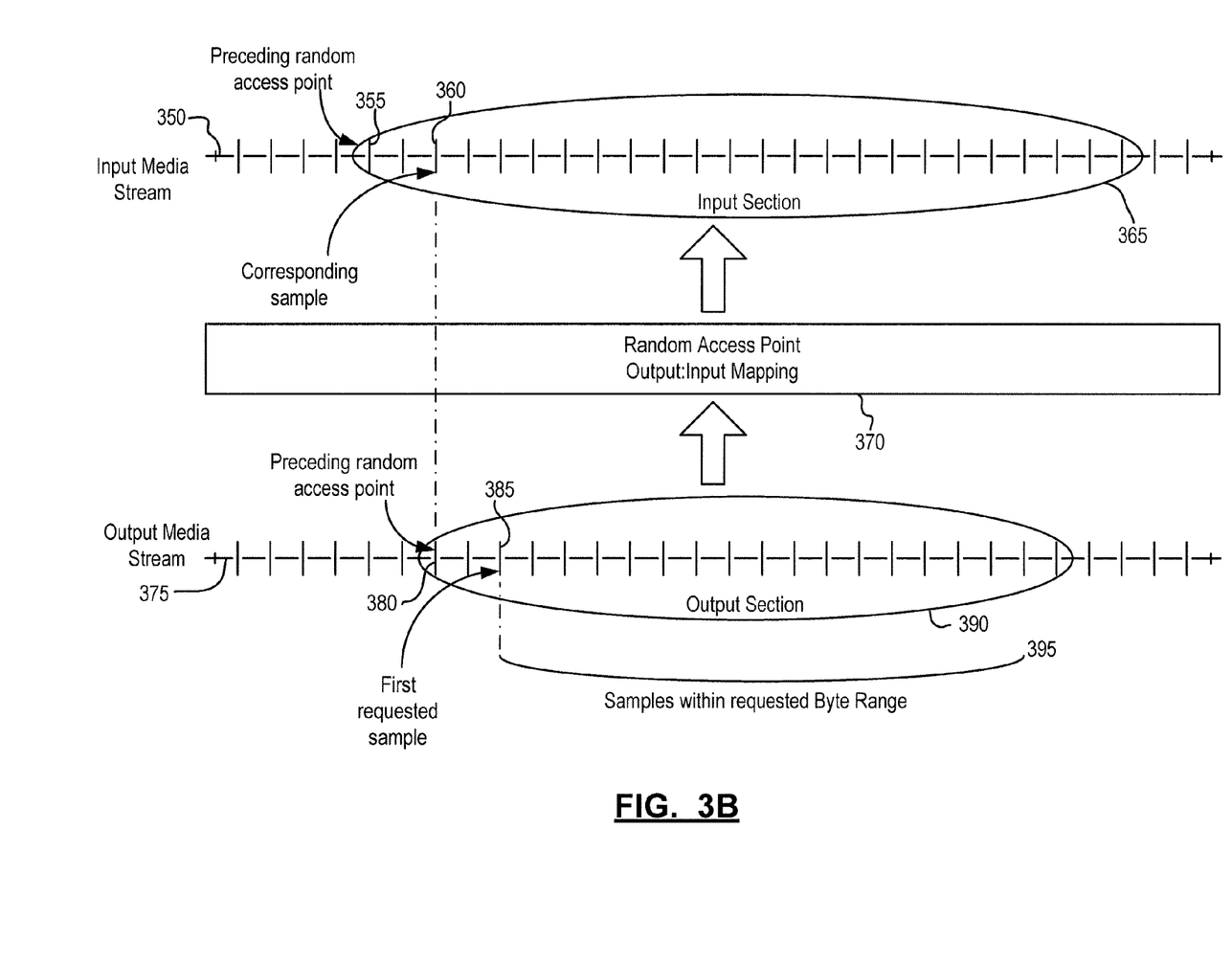
FIG. 3B is a block diagram of an exemplary byte range request.

Reference is now made to FIG. 3B, illustrating a block diagram of an exemplary byte range request, in which the output media stream 375 has different random access points from the input media stream 350.

The example byte range request may be handled by a random access point mapping module 370, within moov box generator 315 of FIG. 3A, which performs the mapping of input and output samples to their respective preceding random access points, and the mapping between random access points in the output and input media stream.

In this example, the client issues a byte range request (either due to a seek or to the protocol used by the client) which corresponds to a series of output samples 395. Because the first requested sample in the byte range is not a random access point, the indexed media processor must begin encoding the output media stream 375 at the nearest preceding random access point 380, the first sample to be encoded, and encode all samples in output section 390.

In some cases, the indexed media processor could stop transcoding after the final requested sample but, when using cache module 340, it is beneficial to continue encoding up to the next random access point and store any samples that were not requested in the cache, in case they are requested in the future.

Since the output media stream 375 has modified random access points relative to input media stream 350, the corresponding sample 360 in the input media stream to the first sample to be encoded 380 in the output section 390 is not a random access point. Therefore, the indexed media processor must begin decoding the input media stream 350 at the nearest preceding random access point 355, the first sample to be decoded, and decode all samples in input section 365.

Figure 4:
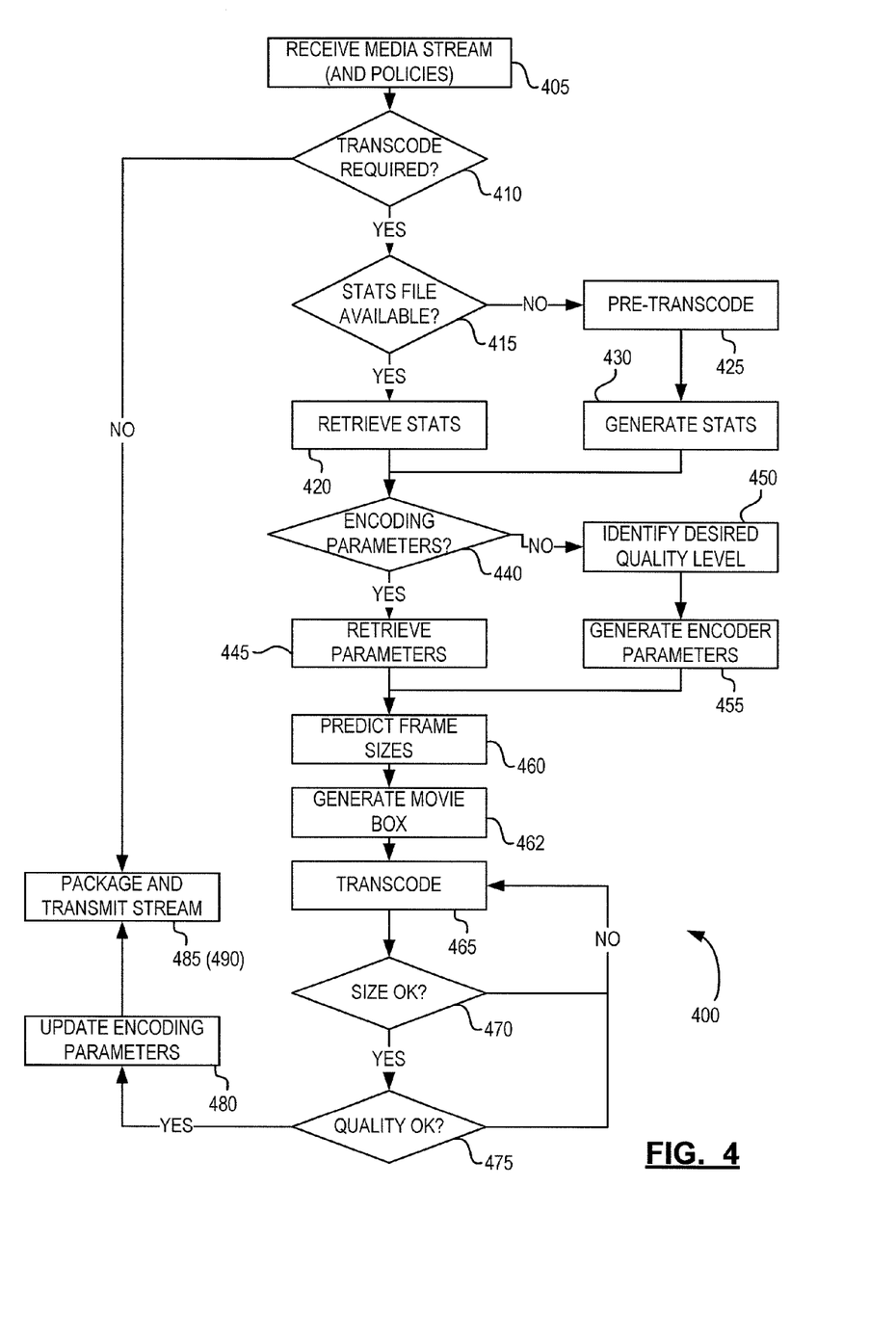
FIG. 4 is a process flow diagram in accordance with an example embodiment.

Referring now to FIG. 4, there is illustrated a process flow diagram that may be executed by an exemplary indexed media processing system 138.

Process flow 400 begins at 405 by receiving media content and data used to transcode the media content, such as statistical data, encoding parameters and subscriber or carrier policies.

Optionally, at 410, the transcoding system may determine whether transcoding of the selected media content is required. For example, if a suitable version of the selected media content is cached, then transcoding may not be required and the cached content can be retrieved.

At 415, the transcoding system may determine whether statistical data relating to the media content exists (e.g., generated during a previous transcoding session). If the statistical data does not exist, one or more segments of the media stream may be selected and encoded at 425. Accordingly, statistics may be generated based on the pre-encoded data (e.g., a plurality of transcoded frame sizes) at 430. Alternatively, if the statistical data does exist, it may be retrieved at 420.

At 440, the transcoding system may determine whether encoding parameters relating to the media content and network conditions exist (e.g., generated during a previous transcoding session). If the encoding parameters do not exist, a determination of the desired quality level may be made at 450, for example, based on QoE, network segment congestion and other factors. Accordingly, new encoding parameters may be generated based on the determination at 455. Alternatively, if suitable previous encoding parameters do exist, they may be retrieved at 445.

At 460, the transcoding system may predict frame sizes for the output media stream. As described herein, the prediction may be based on several factors, including encoding parameters, statistical data, and actual sizes of previously encoded frames.

At 462, the transcoding system may generate a moov box based on media stream metadata and the predicted frame sizes. The moov box may be transmitted to a client device, which may use it to prepare for playback.

Transcoding or re-encoding of incoming media stream frame data can begin at 465. As described herein, the encoder may attempt to satisfy a frame size constraint based on predicted frame sizes. If the frame size constraint is not satisfied at 470, frames may be re-encoded one or more times with varying encoding parameters until the constraint is satisfied.

Similarly, an output quality of the frame data may be evaluated at 475. If the output quality does not satisfy a predetermined quality threshold, for example based on perceived quality scores, the frames may be re-encoded one or more times with varying encoding parameters until the predetermined quality threshold is met.

The encoding parameters may be tuned based on the encoder parameters generated at 455 or retrieved at 445.

Optionally, at 480, transcoding system may store the encoding parameters used to generate the output media stream, and the statistical data generated at 430, for possible future re-use.

At 485, the output media data can be packaged into mdat boxes, and transmitted to a client device at 490.

We claim:

1. A method of transcoding from an input media stream to an output media stream, wherein the input media stream and the output media stream are in an indexed file format, the method comprising:
   receiving the input media stream, wherein the input media stream comprises an input movie box and an input media data box;
   transcoding at least one selected segment of the input media stream one or more times;
   determining a plurality of transcoded frame sizes for the at least one selected segment based on the transcoding;
   generating a plurality of predicted frame sizes based on the input media stream and based on the plurality of transcoded frame sizes;
   generating an output movie box for the output media stream based on the plurality of predicted frame sizes;
   transcoding a plurality of input frames in the input media data box to generate a plurality of output frames in an output media data box wherein the plurality of output frames are sized based on the plurality of predicted frame sizes;
   transmitting the output media stream, wherein the output movie box precedes the output media data box.

2. The method of claim 1, further comprising generating one or more input statistics based on the plurality of transcoded frame sizes, wherein generating the plurality of predicted frame sizes is based on the one or more input statistics.

3. The method of claim 1, wherein the transcoding is carried out in parallel by a plurality of transcoding modules.

4. The method of claim 3, wherein each of the plurality of transcoding modules carries out the transcoding beginning at a random access point in the input media stream.

5. The method of claim 1, further comprising generating a plurality of encoding parameters associated with the output media stream.

6. The method of claim 1, further comprising identifying whether a plurality of encoding parameters associated with the output media stream is stored in a memory, wherein if the plurality of encoding parameters is stored in the memory, the generating the plurality of predicted frame sizes is further based on the plurality of encoding parameters.

7. The method of claim 1, further comprising determining a quality level for transcoding the input media stream to the output media stream, wherein the generating the plurality of predicted frame sizes is further based on the quality level for transcoding.

8. The method of claim 1, wherein the transcoding of the plurality of input frames in the input media data box is repeated one or more times.

9. The method of claim 1, wherein the input movie box comprises metadata information selected from the group consisting of: a number of tracks in the input media stream, a type of track in the input media stream, a track coding information, a frame size for one or more frames in the input media stream, a byte offset for one or more frames in the input media stream and a play duration of one or more frames in the input media stream.

10. An apparatus for transcoding from an input media stream to an output media stream, wherein the input media stream and the output media stream are in an indexed file format, the apparatus comprising:
a memory;
a network interface; and
a processor communicatively coupled to the memory and the network interface, the processor configured to carry out the method comprising:
receiving the input media stream, wherein the input media stream comprises an input movie box and an input media data box;
transcoding at least one selected segment of the input media stream one or more times;
determining a plurality of transcoded frame sizes for the at least one selected segment based on the transcoding;
generating a plurality of predicted frame sizes based on the input media stream and based on the plurality of transcoded frame sizes;
generating an output movie box for the output media stream based on the plurality of predicted frame sizes;
transcoding a plurality of input frames in the input media data box to generate a plurality of output frames in an output media data box wherein the plurality of output frames are sized based on the plurality of predicted frame sizes;
transmitting the output media stream, wherein the output movie box precedes the output media data box.

11. A system for transcoding from an input media stream to an output media stream, wherein the input media stream and the output media stream are in an indexed file format, the system comprising:
a receiver module configured to receive the input media stream, wherein the input media stream comprises an input movie box and an input media data box;
a frame size predictor module configured to transcode at least one selected segment of the input media stream, determine a plurality of transcoded frame sizes for the at least one selected segment, and generate a plurality of predicted frame sizes based on the input media stream and based on the plurality of transcoded frame sizes;
a media data box generator module configured to generate an output movie box for the output media stream based on the plurality of predicted frame sizes;
at least one transcoder module configured to transcode a plurality of input frames in the input media data box to generate a plurality of output frames in an output media data box wherein the plurality of output frames are sized based on the plurality of predicted frame sizes;
a stream output module configured to transmit the output media stream, wherein the output movie box precedes the output media data box.

12. The system of claim 11, further comprising a statistics generation module configured to generate an input statistics file based on the plurality of transcoded frame sizes, and wherein the size generating module is configured to generate the plurality of predicted frame sizes based on the input statistics file.

13. The system of claim 11, wherein the at least one transcoder comprises a plurality of transcoding modules.

14. The system of claim 11, wherein the at least one transcoder is further configured to determining whether the plurality of output frames meet a size constraint and, if not, to repeat the transcoding with a second plurality of parameters to decrease size of the plurality of output frames.

15. The system of claim 11, further comprising a stream parameter generation module configured to generate a stream parameter file associated with the output media stream, the stream parameter file comprising an indication of sizes of the plurality of output frames.

16. The system of claim 11, wherein the size generating module is further configured to determine a quality level for transcoding the input media stream to the output media stream and to generate the plurality of predicted frame sizes based on the quality level for transcoding.

17. The system of claim 11, wherein the media processing module is configured to transcode the plurality of input frames in the input media data box one or more times.

18. The system of claim 11, wherein the input movie box comprises metadata information selected from the group consisting of number of tracks in the input media stream, types of tracks in the input media stream, track coding information, frame sizes for frames in the input media stream, byte offset for frames in the input media stream and play duration of frames in the input media stream.

* * * * *